(12) United States Patent
Scheinkman et al.

(10) Patent No.: US 11,379,207 B2
(45) Date of Patent: Jul. 5, 2022

(54) RAPID BUG IDENTIFICATION IN CONTAINER IMAGES

(71) Applicant: Red Hat, Inc., Raleigh, NC (US)

(72) Inventors: Sebastian Scheinkman, Petah Tikva (IL); Or Shoval, Netanya (IL)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/999,120

(22) Filed: Aug. 21, 2020

(65) Prior Publication Data
US 2022/0058011 A1 Feb. 24, 2022

(51) Int. Cl.
| | | |
|---|---|---|
| G06F 8/61 | (2018.01) | |
| G06F 8/71 | (2018.01) | |
| G06F 8/30 | (2018.01) | |
| G06F 16/2457 | (2019.01) | |
| G06F 9/451 | (2018.01) | |
| G06F 9/445 | (2018.01) | |
| G06F 9/455 | (2018.01) | |
| G06F 21/56 | (2013.01) | |
| G06F 8/658 | (2018.01) | |

(52) U.S. Cl.
CPC ............... *G06F 8/63* (2013.01); *G06F 8/30* (2013.01); *G06F 8/658* (2018.02); *G06F 8/71* (2013.01); *G06F 9/44505* (2013.01); *G06F 9/451* (2018.02); *G06F 9/45545* (2013.01); *G06F 16/24573* (2019.01); *G06F 21/56* (2013.01)

(58) Field of Classification Search
CPC .. G06F 8/60–71; G06F 9/451; G06F 9/44505; G06F 9/45545; G06F 8/30; G06F 16/24573; G06F 8/751

USPC .................................. 717/120–122, 168–178
See application file for complete search history.

(56) References Cited

U.S. PATENT DOCUMENTS

| | | |
|---|---|---|
| 8,612,936 B2 | 12/2013 | Fox et al. |
| 8,819,617 B1 | 8/2014 | Koenig et al. |
| 9,141,378 B2 | 9/2015 | Fox et al. |

(Continued)

OTHER PUBLICATIONS

Zerouali, A., et al., On the Relation between Outdated Docker Containers, Severity Vulnerabilities, and Bugs, IEEE 26th International Conference on Software Analysis, Evolution and Reengineering, Feb. 24-27, 2019, pp. 491-501, [retrieved on Feb. 18, 2022], Retrieved from the Internet: <URL:http://ieeexplore.ieee.org/>.*

(Continued)

*Primary Examiner* — Geoffrey R St Leger
(74) *Attorney, Agent, or Firm* — Kilpatrick Townsend & Stockton LLP

(57) ABSTRACT

Bugs in container images can be rapidly identified. For example, a computing device can receive first metadata about a first container image that includes a first version of a piece of software and second metadata about a second container image that includes a second version of the piece of software. The computing device can obtain first source code from a first location indicated in the first metadata and second source code from a second location indicated in the second metadata. The computing device can determine a difference between the first container image and the second container image by comparing the first source code to the second source code. The computing device can generate an output for display indicating the difference between the first container image and the second container image.

20 Claims, 4 Drawing Sheets

(56) References Cited

U.S. PATENT DOCUMENTS

| | | | |
|---|---|---|---|
| 9,201,632 B2* | 12/2015 | Somani | G06F 8/71 |
| 9,275,087 B2 | 3/2016 | Clemm et al. | |
| 10,102,212 B2 | 10/2018 | Zizka et al. | |
| 10,356,214 B2* | 7/2019 | Joshi | G06F 9/45558 |
| 10,467,003 B1* | 11/2019 | Mendonca | G06F 8/73 |
| 10,613,939 B2* | 4/2020 | Mitkar | G06F 11/2048 |
| 10,659,329 B1* | 5/2020 | Zhao | H04L 41/0803 |
| 10,884,725 B2* | 1/2021 | Nyamars | G06Q 20/02 |
| 11,029,975 B2* | 6/2021 | Prasad | G06F 21/577 |
| 2014/0279903 A1* | 9/2014 | Hsiao | G06F 16/2379 707/638 |
| 2014/0380271 A1* | 12/2014 | Somani | G06F 9/44 717/110 |
| 2015/0363196 A1 | 12/2015 | Carback, III et al. | |
| 2018/0173502 A1* | 6/2018 | Biskup | G06F 21/56 |
| 2018/0285199 A1* | 10/2018 | Mitkar | G06F 11/1451 |
| 2018/0287883 A1* | 10/2018 | Joshi | G06F 9/45558 |
| 2019/0146772 A1* | 5/2019 | Griffin | G06F 8/71 717/121 |
| 2020/0004519 A1* | 1/2020 | Ryall | G06F 8/71 |
| 2020/0104125 A1* | 4/2020 | Pechacek | G06F 8/60 |
| 2020/0192638 A1* | 6/2020 | Pezaris | G06F 8/73 |
| 2020/0310775 A1* | 10/2020 | Nyamars | G06F 8/60 |
| 2021/0042217 A1* | 2/2021 | Hwang | G06F 11/3676 |
| 2021/0103450 A1* | 4/2021 | Prasad | G06F 9/45558 |

OTHER PUBLICATIONS

Xu, Tianyin, et al., Mining Container Image Repositories for Software Configuration and Beyond, ACM/IEEE 40th International Conference on Software Engineering: New Ideas and Emerging Results, May 27-Jun. 3, 2018, pp. 49-52, [retrieved on Feb. 18, 2022], Retrieved from the Internet: <URL:http://ieeexplore.ieee.org/>.*

Allamanis M., et al., "Mining Source Code Repositories at Massive Scale Using Language Modeling," IEEE Working Conference, 2013, pp. 207-216, https://core.ac.uk/reader/28974624.

Gousios, G., et al., "GHTorrent: Github's Data from a Firehose," Department of Management Science and Technology Athens University of Economics and Business, Athens, Greece, 2012, http://citeseerx.ist.psu.edu/viewdoc/download?doi=10.1.1.641.6104&rep=rep1&type=pdf.

Lowe, S., "How to Tag Docker Images with Git Commit Information," Scott's Weblog, 2017, https://blog.scottlowe.org/2017/11/08/how-tag-docker-images-git-commit-information/.

Turner-Trauring, I., "What's running in production? Making your Docker images identifiable," 2019, https://pythonspeed.com/articles/identifying-images/.

* cited by examiner

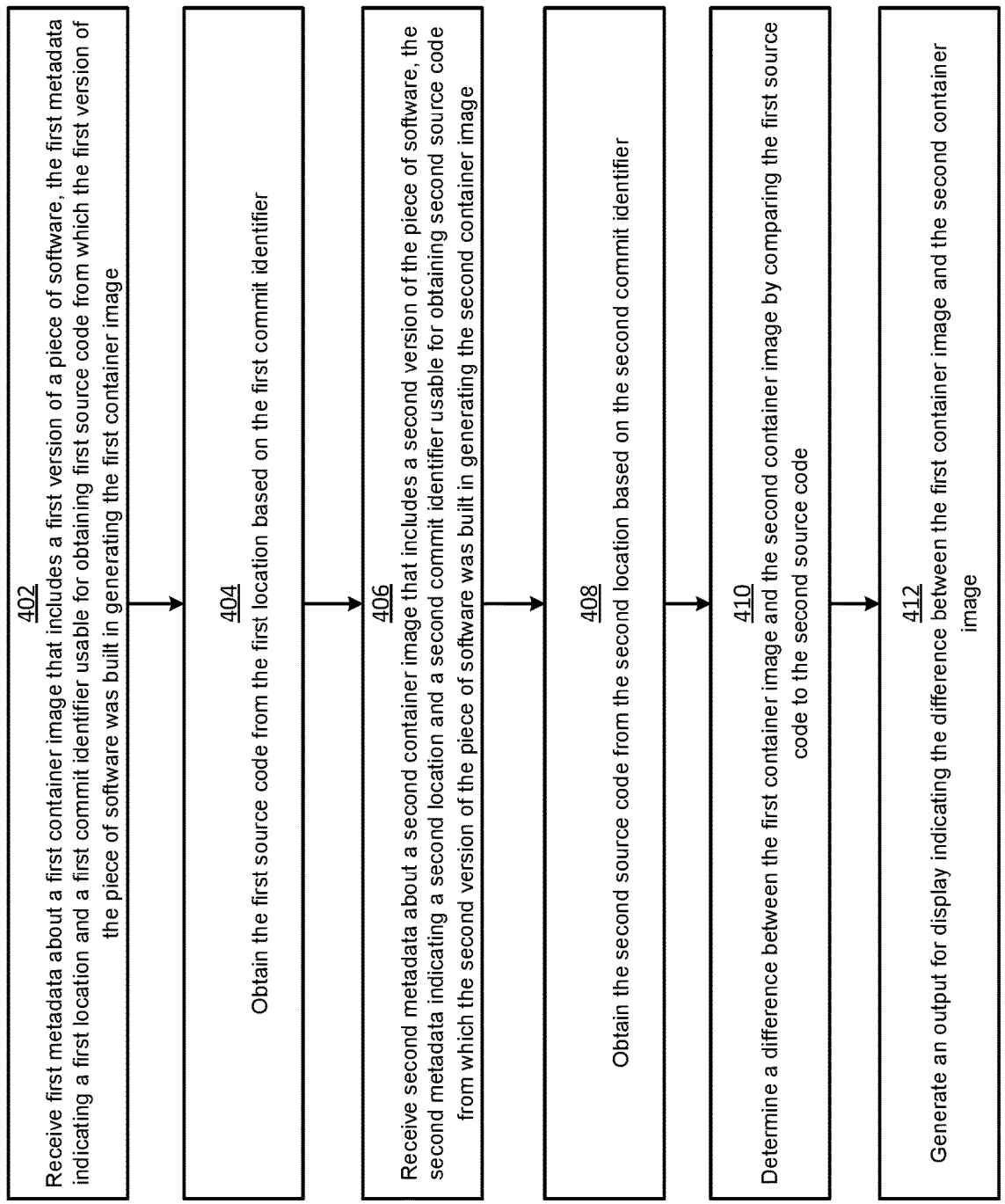

US 11,379,207 B2

RAPID BUG IDENTIFICATION IN CONTAINER IMAGES

TECHNICAL FIELD

The present disclosure relates generally to software development and management. More specifically, but not by way of limitation, this disclosure relates to rapid bug identification in container images.

BACKGROUND

Containers are relatively isolated virtual-environments that are typically deployed from image files, which are referred to herein as container images. A container image can be a static binary file that includes all of the requirements for running a container. Container images can include a compiled version of a software application as well as system libraries and operating system settings. Individual container images cannot be modified, but if a developer wants to make a change, for example to use an updated version of the compiled software application, the updated software application can be packaged into a new container image with the system libraries and operating system settings. The original container image will remain unchanged.

Container images are generally built from a group of files. One example of such files may be source code for a software application. The source code can be created and managed by a group of developers using a version control system, like Github. To make changes to the source code, the developers may submit commits to the version control system, with each commit corresponding to a source code update. The version control system typically logs and manages the commits, and may provide graphical interfaces to easily allow the developers to view relationships between commits.

BRIEF DESCRIPTION OF THE DRAWINGS

FIG. 4 is a flow chart of an example of a process for rapid bug identification in container images according to some aspects of the present disclosure.

DETAILED DESCRIPTION

Figure 1:
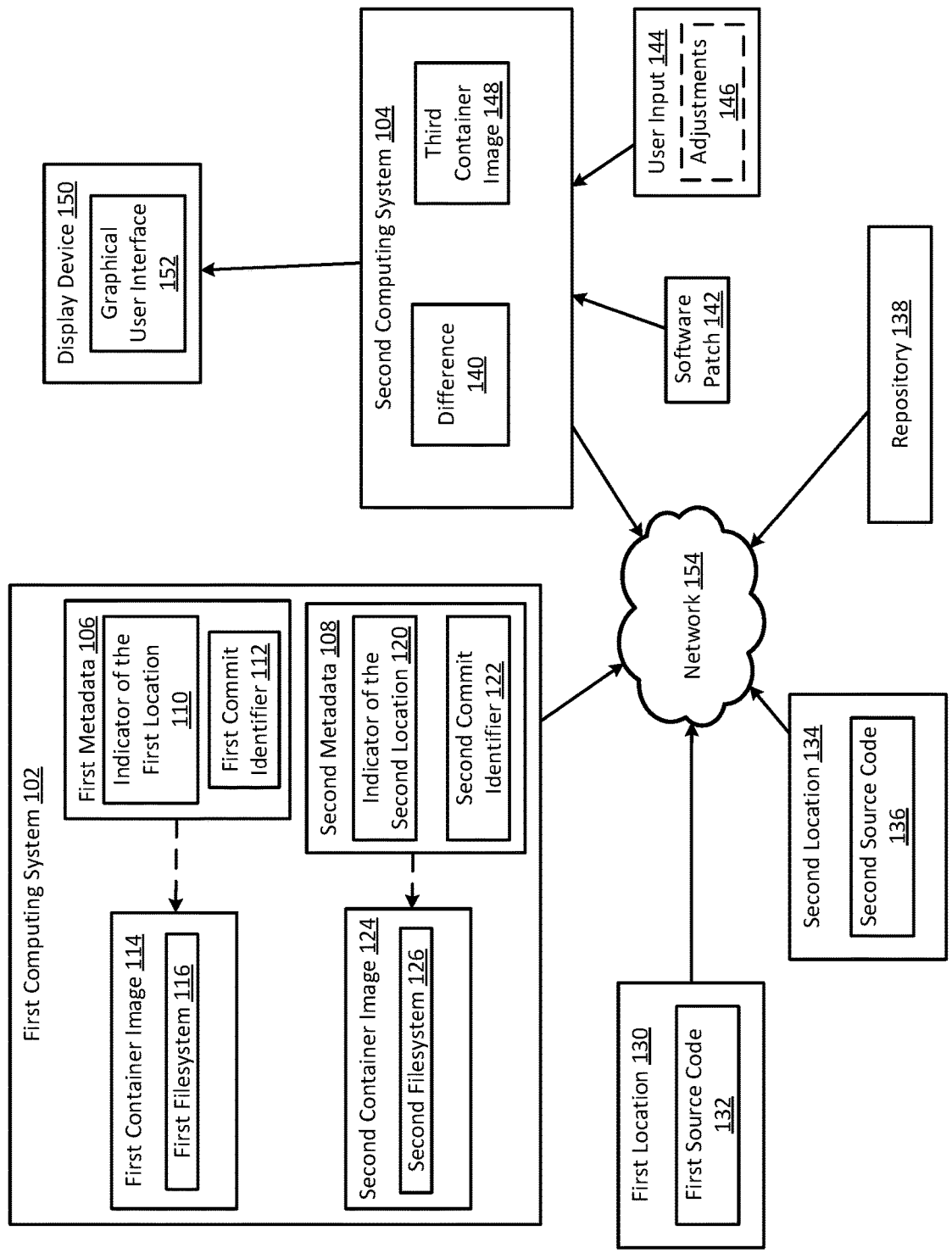
FIG. 1 is a block diagram of an example of a system for implementing rapid bug identification in container images according to some aspects of the present disclosure.

Container images can include software that is compiled from source code stored in a particular location (e.g., in a particular repository on Github). But once the software is compiled and incorporated into the container image, there is no way for future users of the container image to determine where the software's source code came from. For example, there is no way to inspect the container image to determine the location from which the source code was retrieved to compile the software. There is also no way to determine which source code commit was used to compile the software. As a result, bugs in the software can be challenging to track and remedy. If a bug appears in a container image, there is no way to compare the current container image to a previous version of the container image to identify the problem. Software developers must typically manually assess the container image to determine where the problem was introduced. This may result in excessive time being spent on determining the problem, and additional errors are often introduced during the process.

Some examples of the present disclosure overcome one or more of the abovementioned problems by assisting developers with rapidly identifying bugs in container images. In particular, the system can generate source-code provenance data that indicates a location and a commit associated with source code used to generate a piece of software incorporated into a container image. The system can then incorporate such source-code provenance data into the container image, so that the provenance data travels with the container image. This can allows other systems and users to determine which specific version of source code was used to generate the piece of software in a container image, which can aid in debugging the software or the container image.

Additionally, the system can obtain provenance data associated with two container images to determine which versions of source code were used to generate a piece of software in the two container images. The system can then obtain both versions of the source code and automatically compare the source code versions to one another, to determine a difference between the two. The system can also compare other facets of the container images (e.g., their filesystems and logs) to determine other differences between the two. The system can output all of this difference information to a developer, to assist the developer in identifying where a bug was introduced into one of the container images. In some examples, the system can also perform (e.g., automatically perform) other operations based on the difference information. For example, the system can generate and apply a software patch based on the difference information to repair the bug in one of the container images. Additionally, the system can receive input from the developer that includes adjustments to one of the container images to repair the bug. Based on the input, the system can implement the adjustments and then rebuild the container image with the adjustments included.

As a more specific example, a first container image can include a first version of a piece of software, and a second container image can include a second version of a piece of software. A computing device can receive first metadata about the first container image and second metadata about the second container image. The first metadata can specify a location and a commit identifier for first source code from which the first version of the piece of software was built. The second metadata can specify a location and a commit identifier for second source code from which the second version of the piece of software was built. The computing device can then obtain the first source code based on the first metadata, and the second source code based on the second metadata. The computing device can compare the first source code to the second source code to determine a difference between the two. This difference may serve as a proxy for, or otherwise indicate, a difference between the first container image and the second container image. The computing device may perform other comparisons, such as on filesystems or logs (e.g., Git logs) associated with the first container image and the second container image, to determine a difference between the first container image and the second container image. The computing device can generate an output indicating the identified difference(s) between the first container image and the second container image. This may aid a developer in identifying where and how a bug was introduced into one of the container images.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system for implementing rapid bug identification in container images according to some aspects of the present disclosure. The system can include a first computing system 102, a second computing system 104, a first location 130, a second location 134, and a repository 138. Some or all of these components can communicate with one another via a network 154, such as a local area network (LAN) or the Internet.

In some examples, the first computing system 102 (e.g., a server, laptop computer, or desktop computer) can receive first source code 132 for a first version of a software application from the first location 130. An example of the first location 130 can be a version control system, a repository, a website, or any combination of these, where the first source code 132 is stored. The first computing system 102 can also receive second source code 136 for a second version of the software application from the second location 134. An example of the second location 134 can be a version control system, a repository, a website, or any combination of these, where the second source code 136 is stored. The first computing system 102 can then generate a first container image 114 based on the first source code 132, and a second container image 124 based on the second source code 136. For example, the first computing system 102 can compile the first source code 132 into a first executable file for inclusion in the first container image 114, and the first computing system 102 can compile the second source code 136 into a second executable file for inclusion in the second container image 124. The first container image 114 and second container image 124 can also include a first filesystem 116 and a second filesystem 126, respectively. Examples of the first filesystem 116 and second filesystem 126 can be union filesystems (UFS). The first filesystem 116 can include an installed operating system, kernel version, packages, and other data. For example, the first filesystem 116 can include operating system packages and application packages involved in running the first container image 114. The second filesystem 126 can also include an installed operating system, kernel version, packages, and other data.

In some examples, the first computing system 102 can generate first metadata 106 based on the first source code 132. The first metadata 106 can include an indicator of the first location 110 at which the first source code 132 is stored. The first metadata 106 can also include a first commit identifier 112 that uniquely identifies a commit associated with the first source code 132. In some examples, the first commit identifier 112 can include a commit hash uniquely identifying a commit associated with the first source code 132. Similarly, the first computing system 102 can generate second metadata 108 based on second source code 136. The second metadata 108 can include an indicator of the second location 120 and a second commit identifier 122. The indicator of the second location 120 can indicate the second location 134 at which the second source code 136 is stored. The second commit identifier 122 can include a commit hash uniquely identifying a commit associated with the second source code 136.

In some examples, the first computing system 102 can apply the first metadata 106 to the first container image 114. For example, the first computing system 102 can label the first container image 114 with the first metadata 106, such that the first metadata 106 can move with the first container image 114. As one particular example, if a user downloads the first container image 114, the first metadata 106 can be downloaded with the first container image 114 and available to the user. Similarly, the first computing system 102 can apply the second metadata 108 to the second container image 124. For example, the first computing system 102 can label the second container image 124 with the second metadata 108, such that the second metadata 108 can move with the second container image 124.

In some examples, the first computing system 102 can store the first container image 114 with the first metadata 106 to the repository 138. The first computing system 102 can also store the second container image 124 with the second metadata 108 to the repository 138. The repository 138 can be local to the first computing system 102 or at a remote location (e.g., GitHub) accessible via the network 154.

In some examples, a software developer may determine the first container image 114 runs properly, but that the second container image 124 has a bug. To identify the bug, the software developer can operate the second computing system 104 to receive the first metadata 106 and the second metadata 108 from the repository 138. For example, the second computing system 104 may download the entirety of the first container image 114 with the first metadata 106 and the entirety of the second container image 124 with the second metadata 108. Alternatively, the repository 138 can strip the first metadata 106 from the first container image 114 and the second metadata 108 from the second container image 124. The repository 138 can then provide the first metadata 106 to the second computing system 104 independently of the first container image 114, and provide the second metadata 108 to the second computing system 104 independently of the second container image 124.

In some examples, the second computing system 104 can fetch information from the repository 138 about the first container image 114 and the second container image 124. In one such example, the second computing system 104 can receive a command (e.g., an inspect command) from a user. In response to the command, the second computing system 104 can fetch the repository's manifest and other information from the repository 138 about the first container image 114 and the second container image 124. Such information can indicate a creation date, a label, a tag, an operating system, and other attributes of the first container image 114. Attributes of the second container image 124, such as a creation date, a label, a tag, an operating system, and other attributes of the second container image 124 can also be indicated by the repository's manifest and other information from the repository 138. Fetching such information from the repository 138 can allow the second computing system 104 to gather information about the container images, without having to fully or partially download the container images (which can take a significant amount of time and consume network bandwidth and disk space). In some examples, the second computing system 104 can then output the gathered information to the user or use the gathered information in one or more processes described elsewhere herein.

Having received the first metadata 106 and the second metadata 108, the second computing system 104 can use the indicator of the first location 110 and the first commit identifier 112 of the first metadata 106 to obtain the first source code 132 from the first location 130. Additionally, the second computing system 104 can use the indicator of the second location 120 and the second commit identifier 122 of the second metadata 108 to obtain the second source code 136 from the second location 134. The second computing system 104 can then determine a difference 140 between the first container image 114 and the second container image 124 based on the first source code 132 and the second source code 136. For example, the second computing system 104 can determine the difference 140 by comparing the first source code 132 to the second source code 136. The second computing system 104 can perform such a comparison by executing commands (e.g., a diff command) in relation to the first source code 132 and the second source code 136 to determine the difference 140. The difference 140 can indicate changes between the first version of the piece of software and the second version of the piece of software included in the container images 114, 124. Such changes in the source code may be where the bug was introduced.

The second computing system 104 can additionally or alternatively determine the difference 140 using one or more other techniques. For example, the second computing system 104 can determine that the difference 140 includes a filesystem difference between the first filesystem 116 and the second filesystem 126. To determine the filesystem difference, the second computing system 104 can compare a list of binaries stored in the first filesystem 116 to a list of binaries stored in the second filesystem 126. Additionally or alternatively, the second computing system 104 can compare the filesystem structure (e.g., file and folder arrangements and paths) of the first filesystem 116 with filesystem structure of the second filesystem. Additionally or alternatively, the second computing system 104 can compare the filesystem type (e.g., FAT, Ext2, BtrFS, etc.) of the first filesystem 116 to the filesystem type of the second filesystem 126. Such filesystem differences may also account for the bug in the second container image 124.

In some examples, the second computing system 104 can determine the difference 140 between the first container image 114 and the second container image 124 by comparing a first commit history associated with the first container image 114 to a second commit history associated with the second container image 124. For example, the first metadata 106 can contain a first commit hash and a first URL associated with the first container image 114. So, the second computing system 104 can use the first commit hash and the first URL to clone a first repository (e.g., a Git repository) associated with the first container image 114 to a local storage device. An example of the local storage device can be a hard disk. Additionally, the second metadata 108 can contain a second commit hash and a second URL associated with the second container image 124. So, the second computing system 104 can use the second commit hash and the second URL to clone a second repository associated with the second container image 124 to the local storage device. The second computing system 104 can then determine a first commit history associated with the clone of the first repository and a second commit history associated with the clone of the second repository. The second computing system 104 can compare the first commit history to the second commit history to determine differences between the two. The differences can reflect differences between the development process of the first container image 114 and the development process of the second container image 124. For example, the second computing system 104 can determine a difference 140 in which the first commit history includes an additional commit as compared to the second commit history. The additional commit can include source code or filesystem packages that allow the first container image 114 to run properly. The difference 140 can indicate changes that can be implemented for the second container image 124 for the second container image 124 to run properly.

In some examples, the second computing system 104 can determine the difference 140 between the first container image 114 and the second container image 124 by performing a text search on the first container image 114 and the second container image 124. The second computing system 104 can perform the text search on the first source code 132 and the second source code 136, the first filesystem 116 and the second filesystem 126, or both of these. The difference 140 can be a textual string indicating text of the first container image 114 that does not match the text of the second container image 124. As one particular example, the second computing system 104 can perform the text search and determine the text is present in the first source code 132 but not in the second source code 136.

It will be appreciated that the second computing system 104 can implement any combination of the above processes to determine one or more differences 140 between the first container image 114 and the second container image 124. Although only a single box for difference 140 is shown in FIG. 1, difference 140 can represent multiple differences identified using any one or more of the abovementioned techniques, in some examples.

In some examples, the second computing system 104 can generate an output for display indicating the difference 140 between the first container image 114 and the second container image 124. The output can be displayed on a display device 150, such as a liquid crystal display (LCD) or a light-emitting diode (LED) display. The output can include the differences between the first source code 132 and the second source code 136, the differences between the first filesystem 116 and the second filesystem 126, the commit history differences, or any combination of these.

In some examples, the second computing system 104 can generate a graphical user interface 152 for display on the display device 150. The graphical user interface 152 can include a tree view representing relationships between the first container image 114 and the second container image 124. The graphical user interface 152 can show various commit points along a development path and container images that were generated at those commit points. For example, the graphical user interface 152 can show two separate container images were made from an original container image. Additional container images can be made from the two separate container images. A user can view the graphical user interface 152 to trace the family histories of container images to visually identify where they depart from one another, which may be a useful source of information when debugging one of the container images.

In some examples, the second computing system 104 can receive a user input 144 subsequent to generating the output. The user input 144 can include one or more adjustments 146 to the second container image 124. The adjustments 146 can be based on the difference 140 indicated in the output. For example, the adjustments 146 can include changes to the second filesystem 126. Based on the user input 144, the second computing system 104 can build a new version of the second container image 124 (e.g., a third container image 148) that includes the changes, which may mitigate or eliminate the bug.

In some examples, the second computing system 104 can receive user input 144 for patching a file associated with the second container image 124 to mitigate or resolve the bug. In some such examples, the second computing system 104 can automatically create the software patch 142 based on the difference between the first container image 114 and the second container image 124. Alternatively, the second computing system 104 can obtain the software patch 142 from a repository of preexisting software patches. Either way, the second computing system 104 can apply the software patch 142 to a file (e.g., based on a patch command) and incorporate the patched file into a third container image 148 that is separate from the first container image 114 and the second container image 124. The file may contain the second source code 136, a library, or another component used to form the second container image 124. In this way, the third container image 148 can serve as a patched version of the second container image 124.

As one particular example, there can be a bug in the second source code 136. The second computing system 104 can determine the difference 140 (e.g., a git diff) between the first source code 132 and the second source code 136, and convert the difference 140 into the software patch 142. The second computing system 104 can then apply (e.g., in response to a patch command) the software patch 142 to the second source code 136 to generate patched source code. A third container image 148 can be generated to include the patched source code. The third container image 148 may then be stored in the repository 138. For example, the first source code 132 can have a file name of file1 and the second source code 136 can have a file name of file2. A command of "diff file2 file1>patchfile.patch" can be submitted to the second computing system 104 for causing the second computing system 104 to determine the difference 140 and generate a software patch 142 based on the difference. A command of "patch file2 patchfile.patch" can then be submitted for causing the second computing system 104 to apply the software patch 142 to file2 of the second source code 136, thereby generating a patched version of the second source code 136. The third container image 148 can be generated with the patched version of the second source code 136.

In some examples, the user input 144 can be a merge command for merging the first container image 114 and the second container image 124. The second computing system 104 can merge the first container image 114 and the second container image 124 based on receiving the merge command. For example, the second computing system 104 can merge the first source code 132 with the second source code 136, the first filesystem 116 with the second filesystem 126, or both of these.

While the example shown in FIG. 1 depicts a specific number and arrangement of components for simplicity, other examples may include more components, fewer components, different components, or a different arrangement of the components shown in FIG. 1. For example, the first computing system 102 and the second computing system 104 can be the same computing system or separate computing systems. And the first location 130 and the second location 134 can be the same or separate locations.

Figure 2:
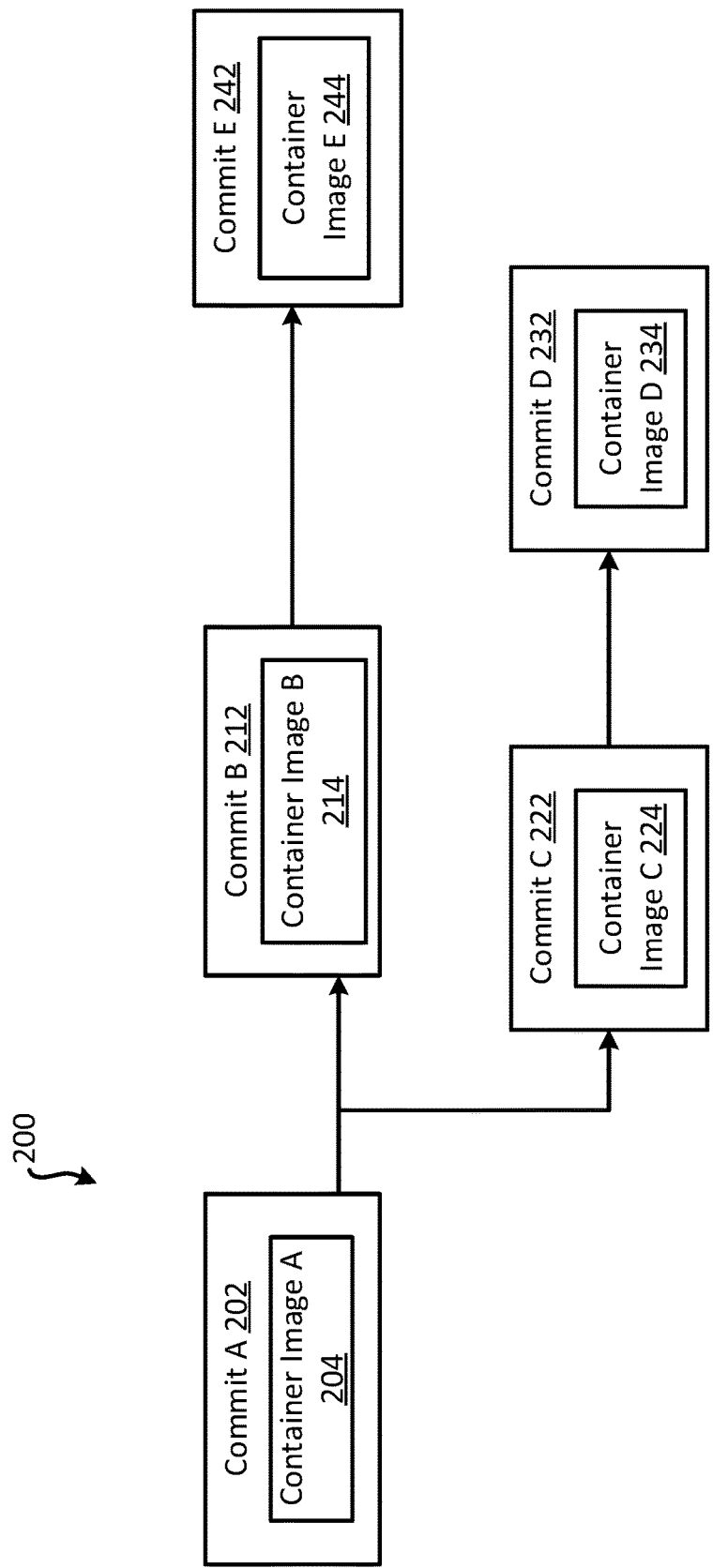
FIG. 2 is a diagram of a tree view of relationships of container images according to some aspects of the present disclosure.

FIG. 2 is a diagram of a graphical user interface 200 showing relationships of container images according to some aspects of the present disclosure. The graphical user interface 200 can have a tree-like structure indicating various commit points along a software development path for a software application that has been incorporated into multiple container images. The graphical user interface 200 can also indicate which container images were generated at the commit points.

In the example shown in FIG. 2, commit A 202 can be an original build commit that was used to generate container image A 204. Commit B 212 and commit C 222 can be separate development paths that split off of commit A 202. Container image B 214 may have been generated based on commit B 212. Container image C 224 may have been generated based on commit C 222. Moving to the right of the tree, commit E 242 can be generated based on commit B 212, and container image E 244 can be generated based on commit E. Similarly, commit D 232 can be generated based on commit C 222, and container image D 234 can be generated based on commit D 232.

The graphical user interface 200 can allow a user to identify commits that may have introduced bugs. For example, if container image E 244 runs properly, but container image D 234 has a bug, the user can determine that the bug was probably introduced in commit C 222 or commit D 232 based on the graphical user interface 200.

Figure 3:
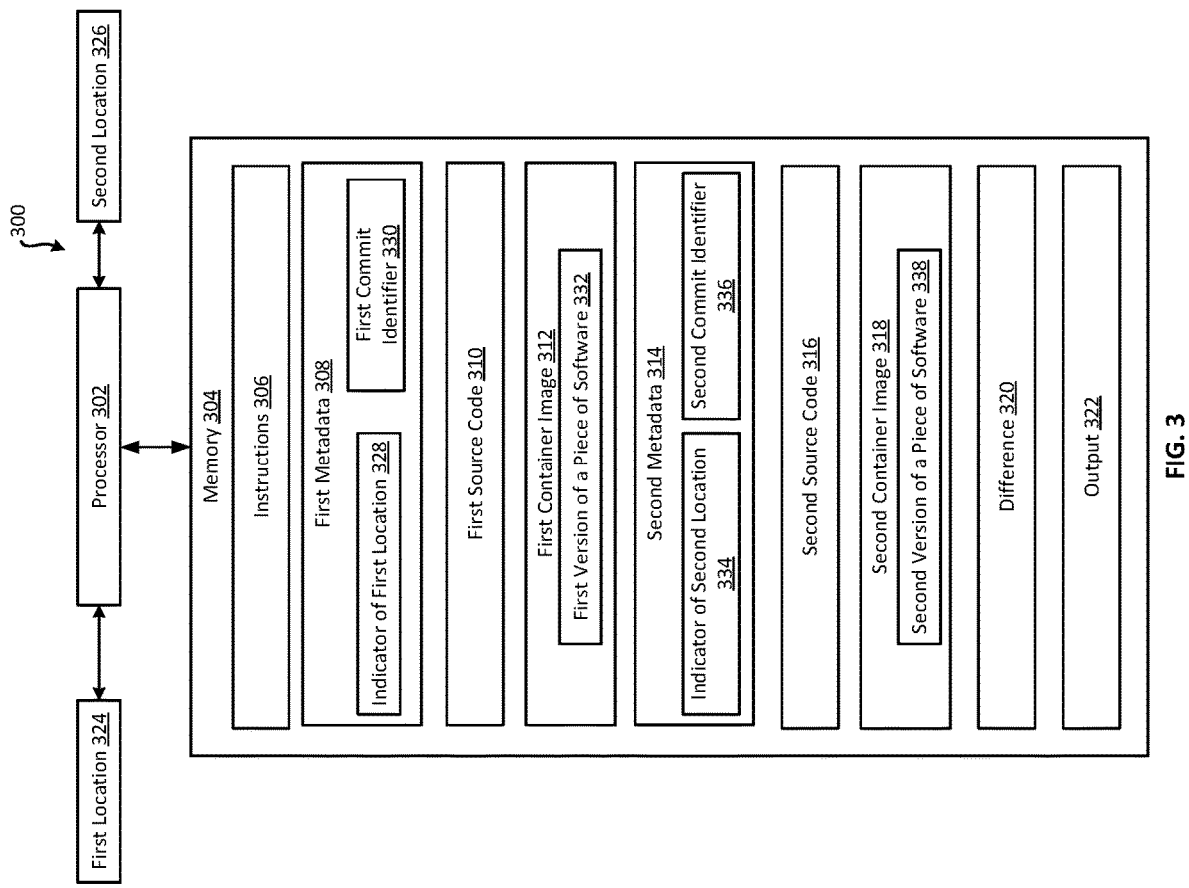
FIG. 3 is a block diagram of another example of a system for implementing rapid bug identification in container images according to some aspects of the present disclosure.

FIG. 3 is a block diagram of another example of a system 300 for implementing rapid bug identification in container images according to some aspects of the present disclosure. The system 300 includes a processor 302 communicatively coupled with a memory 304. In some examples, the processor 302 and the memory 304 can be part of a system, such as the second computing system 104 of FIG. 1.

The processor 302 can include one processor or multiple processors. Non-limiting examples of the processor 302 include a Field-Programmable Gate Array (FPGA), an application-specific integrated circuit (ASIC), a microprocessor, etc. The processor 302 can execute instructions 306 stored in the memory 304 to perform operations. In some examples, the instructions 306 can include processor-specific instructions generated by a compiler or an interpreter from code written in any suitable computer-programming language, such as C, C++, C#, etc.

The memory 304 can include one memory or multiple memories. The memory 304 can be non-volatile and may include any type of memory that retains stored information when powered off. Non-limiting examples of the memory 304 include electrically erasable and programmable read-only memory (EEPROM), flash memory, or any other type of non-volatile memory. In some examples, at least some of the memory can include a medium from which the processor 302 can read instructions 306. A computer-readable medium can include electronic, optical, magnetic, or other storage devices capable of providing the processor 302 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 306.

In some examples, the processor 302 can execute instructions 306 to perform various operations. For example, the processor 302 can receive first metadata 308 about a first container image 312 that includes a first version of a piece of software 332. The first metadata 308 can include an indicator of a first location 328 and a first commit identifier 330 usable for obtaining first source code 310 from which the first version of the piece of software 332 was built in generating the first container image 312. The processor 302 can then obtain the first source code 310 from the first location 324 based on the first commit identifier 330. The processor 302 can also receive second metadata 314 about a second container image 318 that includes a second version of the piece of software 338. The second metadata 314 can include an indicator of a second location 334 and a second commit identifier 336 usable for obtaining second source code 316 from which the second version of the piece of software 338 was built in generating the second container image 318. The processor 302 can then obtain the second source code 316 from the second location 326 based on the second commit identifier 336.

After obtaining the first source code 310 and the second source code 316, the processor 302 can determine a difference 320 between the first container image 312 and the second container image 318 by comparing the first source code 310 to the second source code 316. The processor 302 can then generate an output 322 for display indicating the difference 320 between the first container image 312 and the second container image 318.

In some examples, the processor 302 can implement some or all of the steps shown in FIG. 4. Other examples can include more steps, fewer steps, different steps, or a different order of the steps than is shown in FIG. 4. The steps of FIG. 4 are discussed below with reference to the components discussed above in relation to FIG. 3.

In block 402, a processor 302 receives first metadata 308 about a first container image 312 that includes a first version of a piece of software 332. The first metadata 308 can indicate a first location 324 and a first commit identifier 330 usable for obtaining first source code 310 from which the first version of the piece of software 332 was built in generating the first container image 312. The processor 302 can receive the first metadata 308 independently of, or along with, the first container image 312. In addition to the first source code 310, the first container image 312 can include a first filesystem describing packages of the first container image 312.

In block 404, the processor 302 obtains the first source code 310 from the first location 324 based on the first commit identifier 330. For example, the processor 302 can determine the proper location from which to retrieve the first source code 310 based on the indicator of the first location 328, and the processor 302 can determine the proper commit associated with the first source code 310 based on the first commit identifier 330 (e.g., a unique hash of a commit that includes the first source code 310).

In block 406, the processor 302 receives second metadata 314 about a second container image 318 that includes a second version of the piece of software 338. The second metadata 314 can indicate a second location 326 and a second commit identifier 336 usable for obtaining second source code 316 from which the second version of the piece of software 338 was built in generating the second container image 318. The processor 302 can receive the second metadata 314 independently of, or along with, the second container image 318. In addition to the second source code 316, the second container image 318 can include a second filesystem describing packages of the second container image 318.

In block 408, the processor 302 obtains the second source code 316 from the second location 326 based on the second commit identifier 336. For example, the processor 302 can determine the proper location from which to retrieve the second source code 316 based on the indicator of the second location 334, and the processor 302 can determine the proper commit associated with the second source code 316 based on the second commit identifier 336 (e.g., a unique hash of a commit that includes the second source code 316).

In block 410, the processor 302 determines a difference 320 between the first container image 312 and the second container image 318 by comparing the first source code 310 to the second source code 316. Additionally or alternatively, the processor 302 can determine one or more differences between the first container image 312 and the second container image 318 by comparing the first filesystem of the first container image 312 to the second filesystem of the second container image 318, by comparing a first log associated with the first container image 312 with a second log associated with the second container image 318, by comparing a first commit history associated with the first container image 312 to a second commit history associated with the second container image 318, or any combination of these.

In block 412, the processor 302 generates an output 322 for display indicating the difference 320 between the first container image 312 and the second container image 318. In some examples, the output 322 can be used to generate a software patch for the second container image 318. Additionally or alternatively, the processor 302 can receive a user input based on the output 322, where the user input indicates adjustments for the second container image 318. The processor 302 can generate a third container image based on the user input and the content of the second container image, for example, in an effort to rebuild the second container image without a bug introduced by the difference 320.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, examples described herein can be combined together to yield still further examples.

The invention claimed is:

1. A system comprising:
a processor; and
a memory including instructions that are executable by the processor for causing the processor to:
receive first metadata about a first container image that includes a first version of a piece of software, the first metadata indicating a first location and a first commit identifier corresponding to first source code from which the first version of the piece of software was built in generating the first container image, wherein the first commit identifier is a first commit hash;
obtain the first source code from the first location based on the first commit identifier;
receive second metadata about a second container image that includes a second version of the piece of software, the second metadata indicating a second location and a second commit identifier corresponding to second source code from which the second version of the piece of software was built in generating the second container image, wherein the second commit identifier is a second commit hash;
obtain the second source code from the second location based on the second commit identifier;
determine a difference between the first container image and the second container image by comparing the first source code to the second source code; and
generate an output for display indicating the difference between the first container image and the second container image.

2. The system of claim 1, wherein:
the difference is a first difference;
the first container image includes a first filesystem and the second container image includes a second filesystem; and
the memory further includes instructions executable by the processor for causing the processor to determine a second difference between the first container image and the second container image by comparing the first filesystem to the second filesystem.

3. The system of claim 1, wherein the difference is a first difference, and the memory further includes instructions executable by the processor for causing the processor to determine a second difference between the first container image and the second container image by comparing a first commit history associated with the first container image and a second commit history associated with the second container image.

4. The system of claim 1, wherein the memory further includes instructions executable by the processor for causing the processor to:
receive a user input subsequent to generating the output, the user input including one or more adjustments to the second container image; and
generate a third container image based on the user input and contents of the second container image, the third container image being configured to serve as a rebuild of the second container image that includes the one or more adjustments.

5. The system of claim 1, wherein the memory further includes instructions executable by the processor for causing the processor to:
determine a software patch based on the difference between the first container image and the second container image, the software patch being configured to correct a bug associated with the second container image; and
generate a third container image based on the second container image and the software patch, the third container image being separate from the first container image and the second container image.

6. The system of claim 1, wherein the memory further includes instructions executable by the processor for causing the processor to generate a graphical user interface for display on a display device, the graphical user interface including a tree view representing relationships between the first container image and the second container image.

7. The system of claim 1, wherein the memory further includes instructions executable by the processor for causing the processor to merge the first container image and the second container image into a single container image based on receiving a merge command.

8. The system of claim 1, the difference is a first difference, and wherein the memory further includes instructions executable by the processor for causing the processor to determine a second difference between the first container image and the second container image by performing a text search on the first container image and the second container image, the difference being a textual string.

9. The system of claim 1, wherein the first commit identifier uniquely identifies a commit associated with the first source code, and wherein the second commit identifier uniquely identifies another commit associated with the second source code.

10. A method comprising:
receiving, by a processor, first metadata about a first container image that includes a first version of a piece of software, the first metadata indicating a first location and a first commit identifier corresponding to first source code from which the first version of the piece of software was built in generating the first container image, wherein the first commit identifier is a first commit hash;
obtaining, by the processor, the first source code from the first location based on the first commit identifier;
receiving, by the processor, second metadata about a second container image that includes a second version of the piece of software, the second metadata indicating a second location and a second commit identifier corresponding to second source code from which the second version of the piece of software was built in generating the second container image, wherein the second commit identifier is a second commit hash;
obtaining, by the processor, the second source code from the second location based on the second commit identifier;
determining, by the processor, a difference between the first container image and the second container image by comparing the first source code to the second source code; and
generating, by the processor, an output for display indicating the difference between the first container image and the second container image.

11. The method of claim 10, wherein:
the difference is a first difference;
the first container image includes a first filesystem and the second container image includes a second filesystem; and
the method further comprising determining, by the processor, a second difference between the first container image and the second container image by comparing the first filesystem to the second filesystem.

12. The method of claim 10, wherein the difference is a first difference, and further comprising determining a second difference between the first container image and the second container image by comparing a first commit history associated with the first container image and a second commit history associated with the second container image.

13. The method of claim 10, further comprising:
receiving, by the processor, a user input subsequent to generating the output, the user input including one or more adjustments to the second container image; and
generating, by the processor, a third container image based on the user input and contents of the second container image, the third container image being configured to serve as a rebuild of the second container image that includes the one or more adjustments.

14. The method of claim 10, further comprising:
determining, by the processor, a software patch based on the difference between the first container image and the second container image, the software patch being configured to correct a bug associated with the second container image; and
generating, by the processor, a third container image based on the second container image and the software patch, the third container image being separate from the first container image and the second container image.

15. The method of claim 10, further comprising generating, by the processor, a graphical user interface for display on a display device, the graphical user interface including a tree view representing relationships between the first container image and the second container image.

16. The method of claim 10, wherein the difference is a first difference, further comprising determining a second difference between the first container image and the second container image by performing a text search on the first container image and the second container image, the difference being a textual string.

17. A non-transitory computer-readable medium comprising program code that is executable by a processor for causing the processor to:
- receive first metadata about a first container image that includes a first version of a piece of software, the first metadata indicating a first location and a first commit identifier corresponding to first source code from which the first version of the piece of software was built in generating the first container image, wherein the first commit identifier is a first commit hash;
- obtain the first source code from the first location based on the first commit identifier;
- receive second metadata about a second container image that includes a second version of the piece of software, the second metadata indicating a second location and a second commit identifier corresponding to second source code from which the second version of the piece of software was built in generating the second container image, wherein the second commit identifier is a second commit hash;
- obtain the second source code from the second location based on the second commit identifier;
- determine a difference between the first container image and the second container image by comparing the first source code to the second source code; and
- generate an output for display indicating the difference between the first container image and the second container image.

18. The non-transitory computer-readable medium of claim 17, wherein the difference is a first difference, the first container image includes a first filesystem and the second container image includes a second filesystem, and the non-transitory computer-readable medium further comprises program code that is executable by the processor for causing the processor to determine a second difference between the first container image and the second container image by comparing the first filesystem to the second filesystem.

19. The non-transitory computer-readable medium of claim 17, further comprising program code that is executable by the processor for causing the processor to:
- receive a user input subsequent to generating the output, the user input including one or more adjustments to the second container image; and
- generate a third container image based on the user input and contents of the second container image, the third container image being configured to serve as a rebuild of the second container image that includes the one or more adjustments.

20. The non-transitory computer-readable medium of claim 17, further comprising program code that is executable by the processor for causing the processor to:
- determine a software patch based on the difference between the first container image and the second container image, the software patch being configured to correct a bug associated with the second container image; and
- generate a third container image based on the second container image and the software patch, the third container image being separate from the first container image and the second container image.

* * * * *